United States Patent [19]

Bacardit

[11] Patent Number: 4,540,024
[45] Date of Patent: Sep. 10, 1985

[54] ROTATING HYDRAULIC DISTRIBUTOR AND METHOD OF MANUFACTURING CHAMFERED CLOSING EDGES OF A ROTATING MEMBER OF SUCH A DISTRIBUTOR

[75] Inventor: Juan S. Bacardit, Barcelona, Spain

[73] Assignee: Bendiberica, S.A., Barcelona, Spain

[21] Appl. No.: 497,303

[22] Filed: May 23, 1983

[30] Foreign Application Priority Data

May 26, 1982 [FR] France ................. 82 09133

[51] Int. Cl.³ ............................................... E03B 3/00
[52] U.S. Cl. ............................ 137/625.21; 91/375 R
[58] Field of Search ................... 251/118, 120, 205; 137/625.3, 625.21; 91/375 R, 375 A

[56] References Cited

U.S. PATENT DOCUMENTS

| | | | |
|---|---|---|---|
| 907,130 | 12/1908 | Cramer | 251/205 |
| 2,009,967 | 7/1935 | Dahnke | 137/625.3 |
| 2,642,254 | 6/1953 | Armstrong | 251/118 |
| 3,103,941 | 9/1963 | Watters | 251/205 |
| 4,310,024 | 1/1982 | Bacardit | 137/625.21 |
| 4,452,274 | 6/1984 | Haga et al. | 91/375 A |
| 4,459,897 | 7/1984 | Bacardit | 91/375 A |

FOREIGN PATENT DOCUMENTS

| | | | |
|---|---|---|---|
| 0021970 | 1/1981 | European Pat. Off. | 137/625.21 |
| 2372065 | 6/1978 | France | 137/625.21 |

*Primary Examiner*—Samuel Scott
*Assistant Examiner*—Noah Kamen
*Attorney, Agent, or Firm*—Larry J. Palguta; Ken C. Decker

[57] ABSTRACT

In a rotating hydraulic distributor of the type comprising two axially adjacent rotating members (20, 23) arranged for relative rotation one with respect to the other over a limited angular range, both said rotating members having cooperating closing edges (30, 31) defining therebetween a modulable fluid flow passage, at least one of said edges (30) presents a chamfer having an evolutive profile with non-parallel generatrices whereby, for each relative angular offsetting between both said rotating members, the fluid flow passsage ($S_2$) between said cooperating edges has an identical width over the length extension, substantially in the radial direction, of the passage.

7 Claims, 9 Drawing Figures

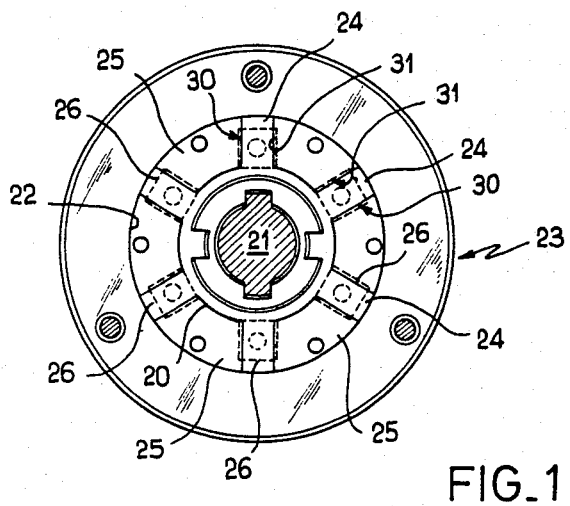
FIG_1
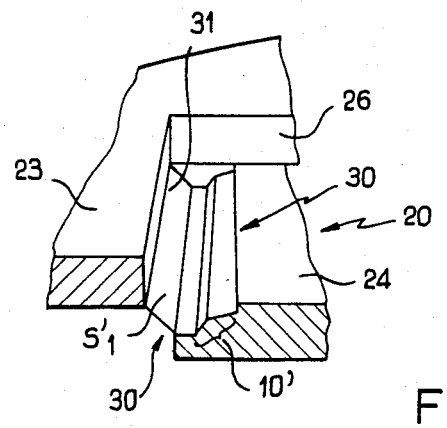
FIG_2
PRIOR ART
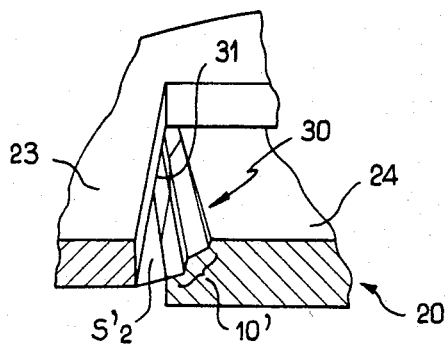
FIG_3
PRIOR ART

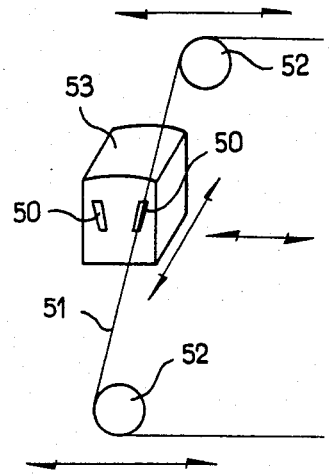
FIG_8
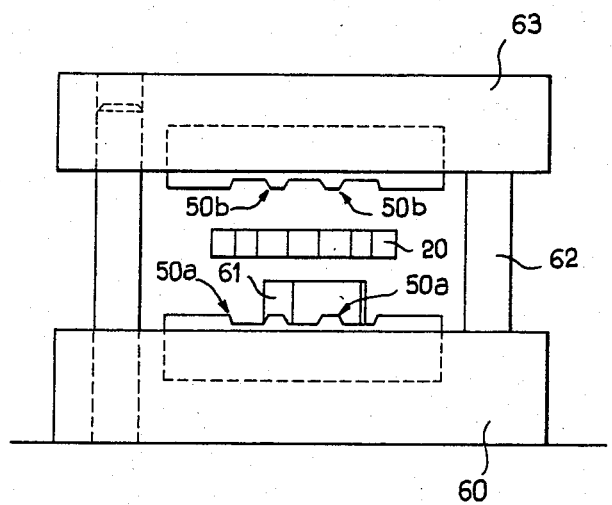
FIG_9

ROTATING HYDRAULIC DISTRIBUTOR AND METHOD OF MANUFACTURING CHAMFERED CLOSING EDGES OF A ROTATING MEMBER OF SUCH A DISTRIBUTOR

BACKGROUND OF THE INVENTION

The present invention relates to a rotating hydraulic distributor for hydraulic actuating systems, more particularly for power assisted systems of automotive vehicles, of the type comprising two axially adjacent members adapted to rotate one relative to the other over a limited angular range under the action of a control means, each said member comprising at least one aperture opening on its face directed toward the other member, the adjacent lateral edges of associated apertures of said members mutually cooperating, during relative rotation of said members so as to define a modulable elongated fluid flow passage between said apertures.

Historically, rotating hydraulic distributors have been developed initially under the form of an elongated cylindrical rotor arranged coaxially within a sleeve, both said members have axially extending grooves opening at the level of the interface between said two members and selectively mutually cooperating to define selective fluid flow paths in the distributor while producing a differential pressure variation for actuation of an hydraulic assistance motor. In such a class of distributor, a progressive exposure or closure of the groove establishes modulable fluid flow passages having well determined lateral dimensions by reasons of the parallelism of the (axial) edges of the grooves. However, due to quite important noise problems occurring at the beginning of the opening of the fluid flow passages, the distributor manufacturers have been led to provide said closing lateral edges with chamfers which permit to achieve a more progressive opening (or closure) of the fluid flow passage. Such a technique is disclosed in the European patent application Ser. No. 0,012,043 (DBA).

For reasons of reduction of overall dimensioning of the rotating hydraulic distributors and in order to simultaneously permit a better flexibility in the functions achieved by the rotating distributor, the Applicant has developed rotating hydraulic distributors comprising two axially adjacent members according to the so-called technique of the "star-shaped" rotor, such as disclosed in U.S. Pat. No. 4,459,897 issued July 17, 1984 in the name of the Applicant company, the content of which is supposed integrated here for reference. Said technique has therebetween led to interesting developments by taking into account the fact that the shape of the chamfers of the closing lateral edges of the different arms of the star-shaped rotor can be used to control successive portions of the characteristic curve input torque/actuating fluid pressure of the distributor. Such a technique is disclosed in U.S. Pat. No. 4,310,024 in the name of the Applicant company.

However, contrary to the hydraulic distributors of the type embodying a cylindrical rotor and a peripheral sleeve, the relative angular displacement of said two axially adjacent members raises problems of angular misalignment between the cooperating lateral edges of each member by reason of the variations of the radii between the base (adjacent the rotation center) and the outer end (more remote from said rotation center) of said cooperating edges. Thus, if, in the rest position of the distributor, the two adjacent cooperating edges belonging respectively to the first and second rotating members extend parallel to each other to provide therebetween a fluid flow passage having a substantially rectangular shape, as a result of a relative rotation between said distributor members, for instance for restricting said fluid flow passage, the fluid flow passage will adopt the shape of a wedge, with a width (as taken in the peripheral direction) varying in dependence of the radial length extension of the passage. Resulting therefrom is an effective loss of control of the optimum dimensions of the fluid flow passage together with the apparition of a phenomenon of fluid flow recirculation in the radial direction, which induces intempestive pressure drops, perceptible noises and even an intempestive instability in operation of the distributor. Said phenomena are still increased when providing the closing edges with chamfers, e.g. a single chamfer or more often with simple or successive step-shaped chamfer formations.

SUMMARY OF THE INVENTION

One object of the invention is to provide a rotating hydraulic distributor of the type defined above which permits to obtain, for each relative angular offsetting between the distributor rotating members, a fluid flow passage having controlled dimensions and a width substantially equal along the length extension (in the radial direction) of the passage, whereby allowing the provision of a fluid flow passage operating in laminar conditions and preventing occurrence of recirculation phenomena and hydraulic noises.

There is another object of the invention to provide a rotating hydraulic distributor arrangement which permits to efficiently control the fluid flow passages between two adjacent cooperating closing edges of the distributor rotating members.

In order to meet these objects and others, according to a feature of the invention, at least one of said cooperating lateral edges of a first of said rotating members is shaped so as to present a chamfer having an evolutive profile which is determined so as the fluid flow passage between the cooperating edges of both rotating members has, for each relative angular offsetting of said rotating members within at least a portion of the limited relative angular rotational range of said members, a substantially identical width along the length extension in the radial direction of the passage.

According to another feature of the invention, said evolutive profile of the chamfer is a ruled surface (as generated by the displacement of a straight line) with non-parallel generatrices.

The invention as for other object, to provide a single and reliable method of manufacturing such a chamfered closing edge of a rotating member of such an hydraulic distributor.

In relation thereto, according to another feature of the invention, the chamfered edge is punched by means of a die having such an evolutive profile and obtained by wire electro-erosion.

Other features and advantages of the present invention will appear from the following description of embodiments, given for illustrative but non-limitative purposes, made in connection with the appended drawings, wherein:

BRIEF DESCRIPTION OF THE DRAWINGS

FIG. 1 schematically shows in front view a rotating hydraulic distributor with a star-shaped rotor according to an aspect of the invention;

FIGS. 2 and 3 schematically illustrate the problems encountered in the former techniques with rotating distributor members having closing edges chamfered but extending straight;

FIG. 8 schematically illustrates the method of manufacturing the punching dies for obtaining the chamfers according to the invention; and FIG. 9 schematically illustrates a punching equipment for manufacture of a chamfered star-shaped rotor according to the invention.

DESCRIPTION OF THE PREFERRED EMBODIMENT

Figure 4:
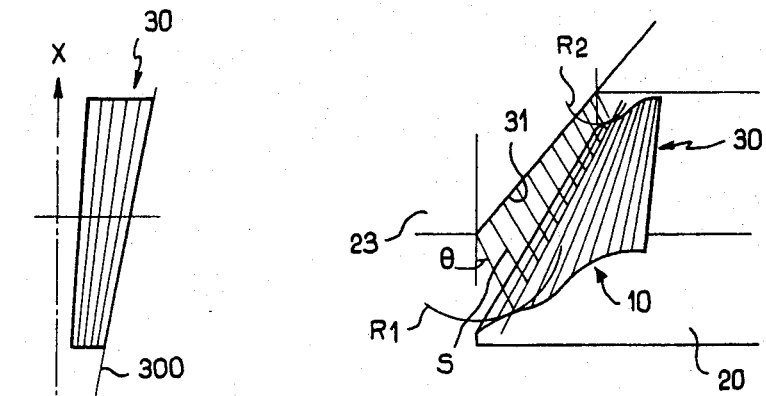
FIGS. 4 and 5 schematically illustrate the conditions for determining the ruled surface of the chamfers of the closing edges of the hydraulic distributor rotating members according to the invention.

There is schematically illustrated in FIG. 1 a rotating hydraulic distributor of the class to which the present invention applies, such as disclosed in French Patent Application No. 2 372 065. Such a distributor essentially comprises a first rotating member or rotor 20 coupled for rotation to an input control shaft 21 and totally received within a discoidal cavity 22 formed in a second coaxial rotating member or stator 23 coupled for rotation to an output shaft (not shown), a lost-motion coupling mechanism (of the type embodying a torsion bar or C-springs) interconnecting the input shaft 21 and the output shaft so as to permit limited angular rotation of the rotor 20 with respect to the stator 23. The outwardly radially extending arms 24 of the rotor 20 delimitate within the discoidal cavity 22 a determined number of pairs of fluid chambers 25. Within the stator 23 are formed apertures 26 which open in the axially facing lateral walls of the discoidal cavity 22 at the level (in the rest position of the distributor) of at least some of the arms 24 of the rotor 20. With such an arrangement, the lateral substantially radially extending edges 30 of the arms 24 of the rotor cooperate with corresponding lateral substantially radially extending edges 31 of the apertures 26 so as to form together selective communicating fluid flow passages between the chambers 25 and said apertures 26 to thereby actuate, as a result of a relative rotation of the rotor 20 with respect to the stator 23 in either the opposite rotational directions, a double effect hydraulic motor, for instance for assisting a steering mechanism for the steering wheels of an automotive vehicle.

There is illustrated at a greater scale in FIGS. 2 and 3 the modulable fluid flow passage zone between the lateral closing edges 30 of one arm of the rotor 20 and the corresponding edges 31 of the apertures 26 in the inner wall of the stator 23. As above mentioned, at least the closing edge 30 of an arm 24 of the stator 20 presents a chamfered shape typically in a step-like configuration 10' as illustrated. In the rest position of the distributor shown in FIG. 2, the fluid flow passage (illustrated by the section passage S'$_1$) has a substantially rectangular section, the adjacent sharp edges of the stator and of the chamfers 10' of the rotor extending substantially parallel. On the other hand, after relative rotation of the rotor has been accomplished with respect to the stator 23, as illustrated in FIG. 3, in such a prior art technique with straight chamfers, the form of the fluid flow passage section S'$_2$ delimited between the cooperating edges of both members take a configuration completely deformed into a warped surface whose dimensions vary greatly along the radial length extension of the restriction thus defined between both rotating members.

Figure 5:
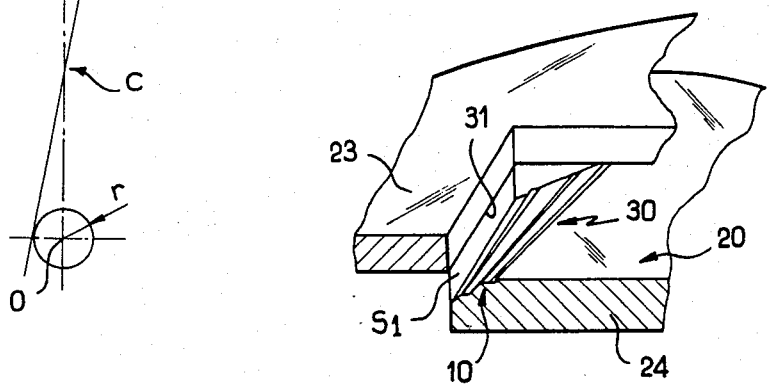
Figure 6:
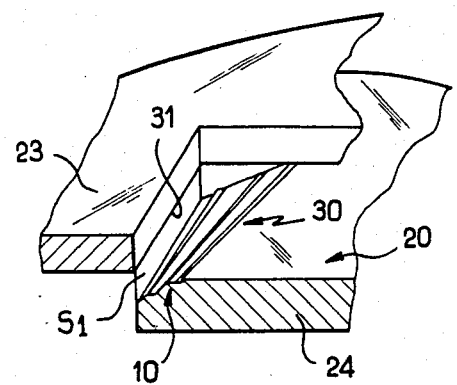
FIGS. 6 and 7 correspond to FIGS. 2 and 3 and illustrate schematically the attainment of controlled fluid flow passages with a chamfer according to the invention.
Figure 7:
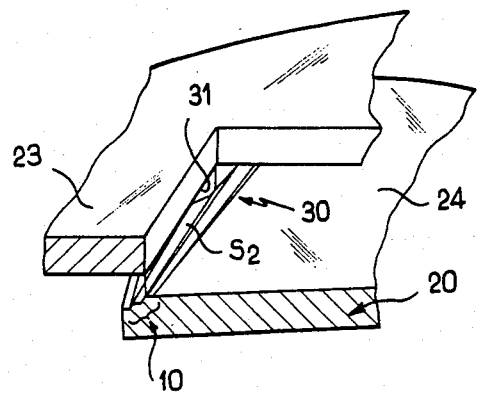

On the contrary, as illustrated in FIG. 4, according to the principles of the invention, the passage section or restriction S between the sharp edge 31 of the stator 23 and the adjacent closed "zone" of the chamfered edge 30 of the rotor 20 is not defined exactly straight below edge 31 but according to a surface (S) angularly offset axial plane defining the edge 31 of an angle $\theta$ which varies depending on the profile 10 of the chamfered edge 30. According to the invention, the surface of the chamfered edge 30 is determined with respect to the transversal profile 10 which is in turn chosen depending upon the required effect in operation of the rotating hydraulic distributor in such a manner that, for each relative angular position between both rotating members 20 and 23, said above-mentioned "zone" of the chamfer 30 is a straight-line extending parallel to the edge 31 of the stator 23, the slope of said straight-line with respect to the common rotational plane of both rotating members (perpendicular to the axis of the rotating distributor) being determined in such a manner that the radii of the outer contact circle $R_1$ and of the inner contact circle $R_2$ are substantially equal. Thus, as illustrated in FIG. 5, taking into account the fact that the plane of the restriction surface S for each relative angular position of both rotating members 20 and 23 is angularly offset of variable angle $\theta$ with respect to the edge 31 of the stator 23 depending upon the profile 10 selected in transversal cross-section for the chamfer, the generatrices, such as generatix 300, of the chamfered edge 30 substantially converge toward a zone C offset, along the axis OX, from the common rotation center O of both rotating members, the maximum angle $\alpha$ of the extreme generatrix 300 corresponding to the angular offsetting angle authorized between both rotating members. There is thus obtained, as illustrated in FIGS. 6 and 7, a chamfered surface which is a ruled surface having non-parallel generatrices defining successive incremental steps having a width (in the peripheral direction) increasing toward the exterior of the rotor. With such an arrangement, if, as illustrated in FIG. 6, the passage section $S_1$ in the rest condition of the distributor is indeed rectangular, as was substantially the surface S'$_1$ in the rest position of the prior art distributor, for each relative angular position between the rotating members 20 and 23 of the invention, as illustrated in FIG. 7, the passage section $S_2$, each time different, keeps a profile substantially rectangular, for each said relative angular position has a width substantially constant all over the length extension in the radial direction of the fluid flow passage, all over the limited angular offsetting range between both rotating members.

According to the invention, the chamfered surface 30 is obtained by punching the edge of the rotor arm by a die 50 having the same profile 10 but inverted. The ruled warped surface of each die 50 is advantageously realized within a wire electro-erosion machine as schematically depicted in FIG. 8. Thus, with such an electro-erosion machine, the electro-eroding wire 51 can be displaced angularly within the plane of its return pulleys 52 by selectively laterally moving one and/or the other of said pulleys 52 when the mounting block 53 supporting both dies 50 (for the adjacent edges of each rotor arm) to be machined may be moved laterally to and fro as illustrated by the arrows in said FIG. 8. Wire electro-erosion machine suitable for manufacturing such punching dies is for instance available under the appellation "AGIECUT DEM 315" from Société Anonyme AGIE in Locarno (Switzerland).

There is further schematically illustrated in FIG. 9 a punching installation for punching the edges of the rotor arms 20. One can recognize, in FIG. 9, the frame 60 of the punching machine which carries the lower die 50a, the device 61 for centering the rotor hub 20, and the sliding columns 62 for the upper frame 63 carrying the upper die 50b for obtaining symmetric punching of each lateral edge of the arms of the rotor 20.

Although disclosed in relation with a preferred embodiment, the present invention is not limited thereto but is also intended to include all modifications and changes which will appear to those skilled in the art. More particularly, realization of the closing chamfered edges does not only apply to the so-called "star-shaped" but also to the disc-shaped rotors having internal recesses in the hydraulic rotating valves of the type embodying two mutually cooperating disc-shaped valve members. Similarly, although practically the closing edge extends substantially radially, the present invention also applies to closing edges each extending angularly offset from the radial direction, whereby the direction of the edge of the aperture of the stator here serves to determine the reference direction.

I claim:

1. A rotating hydraulic distributor, comprising at least two axially adjacent rotating members, (20, 23) adapted for relative rotation through a limited angular range and about a common axis (O) and under the action of control means, said rotating members (20, 23) having mutually cooperating axial surfaces each formed with at least one aperture having at least one edge and opening in the axial direction toward the aperture of the other adjacent rotating member, lateral edges (30, 31) of the adjacent apertures mutually cooperating to define an elongated fluid flow passage ($\theta$, S) whose cross-sectional area is adjustable by relative rotation between said rotating members (20, 23), at least one (30) of the mutually cooperating lateral edges (30, 31) being formed with chamfer means (30) having a profile (10) comprising a surface (30) formed by a plurality of planes whose lines (300) of intersection form non-parallel generatrices (300) which converge substantially toward a zone (C) offset from the common axis (O) of said two rotating members (20, 23) to define said fluid flow passage ($\theta$, S) as a passage ($\theta$, S) having a substantially constant axial width ($R_1$; $R_2$) over the length of the passage, wherein first ($R_1$) and second ($R_2$) axial separation distances between the chamfer means (30) and other lateral edge (31) are substantially equal, for each relative angular position ($\alpha$) between said rotating members (20, 23) and within at least a portion of said limited angular range.

2. The distributor according to claim 1, wherein said chamfer means (30) has, in transverse cross-section, a non-linear profile (10).

3. The distributor according to claim 1, wherein said cooperating lateral edges (30, 31) extends substantially radially.

4. The distributor according to claim 3, wherein one (20) of said rotating members (20, 23) formed with said chamfer means (30) is a star-shaped rotor (20) having radially extending arms (24).

5. The distributor according to claim 1, wherein said chamfer means (30) is formed by means of a die (50) having said profile (10).

6. The distributor according to claim 5, wherein said die (50) is obtained by means of wire electro-erosion.

7. A rotating hydraulic distributor, comprising at least two axially adjacent rotating members (20, 23) adapted for relative rotation through a limited angular range and about a common axis (O) and under the action of rotatable control means, said rotating members (20, 23) having mutually cooperating axial surfaces each formed with at least one aperture having at least one edge and opening in the axial direction toward the aperture of the other adjacent rotating member, lateral edges (30, 31) of the adjacent apertures mutually cooperating to define an elongated fluid flow passage ($\theta$, S) whose cross-sectional area is adjustable by relative rotation between said rotating members (20, 23), at least one (30) of the mutually cooperating lateral edges (30, 31) being formed with chamfer means (30) having an evolutive profile (10) with a sectional contour (10) which has non-parallel generatrices (300) emanating from a zone (C) offset from said common axis (O) of the two members (20, 23) and substantially radially oriented to define said fluid flow passage ($\theta$, S) as a laminar passage ($\theta$, S) having a subtantially constant axial width ($R_1$; $R_2$) over the length of the passage, wherein first ($R_1$) and second ($R_2$) axial separation distances between the sectional contour (10) and other lateral edge (31) are substantially equal, for each relative angular position ($\alpha$) between said rotating members (20, 23) and within at least a portion of said limited angular range.

* * * * *